US006996157B2

(12) United States Patent  
Ohsuge (10) Patent No.: US 6,996,157 B2  
(45) Date of Patent: Feb. 7, 2006

(54) PATTERN GENERATION CIRCUIT, MULTI-PATH DETECTION CIRCUIT EMPLOYING THE SAME AND MULTI-PATH DETECTION METHOD

(75) Inventor: Michihiro Ohsuge, Tokyo (JP)

(73) Assignee: NEC Corporation, Tokyo (JP)

( * ) Notice: Subject to any disclaimer, the term of this patent is extended or adjusted under 35 U.S.C. 154(b) by 1049 days.

(21) Appl. No.: 09/770,506

(22) Filed: Jan. 29, 2001

(65) Prior Publication Data

US 2001/0010703 A1 Aug. 2, 2001

(30) Foreign Application Priority Data

Feb. 2, 2000 (JP) .............................. 2000-024559

(51) Int. Cl.
*H04B 1/69* (2006.01)
(52) U.S. Cl. ..................................... 375/148
(58) Field of Classification Search ........ 375/142–150, 375/152, 148, 143, 144, 145, 147, 149
See application file for complete search history.

(56) References Cited

U.S. PATENT DOCUMENTS

| 5,812,593 | A | 9/1998 | Kaku |
|---|---|---|---|
| 5,960,028 | A | 9/1999 | Okamoto et al. |
| 6,181,732 | B1 | 1/2001 | Komatsu |
| 6,519,451 | B1 | 2/2003 | Natori et al. |

FOREIGN PATENT DOCUMENTS

| EP | 0 814 573 A2 | 12/1997 |
|---|---|---|
| EP | 1 096 694 A1 | 5/2001 |
| JP | 8032553 A | 2/1996 |
| JP | 8181636 A | 7/1996 |
| JP | 9270735 A | 10/1997 |
| JP | 10308688 A | 11/1998 |
| JP | 10336072 A | 12/1998 |
| JP | 2000101549 A | 4/2000 |
| JP | 2000252871 A | 9/2000 |
| JP | 2000269860 A | 9/2000 |
| JP | 2000278177 A | 10/2000 |
| JP | 2001203608 A | 7/2001 |
| WO | WO 99/35763 | 7/1999 |
| WO | WO 9935763 A1 * | 7/1999 |
| WO | WO 00/04648 | 1/2000 |
| WO | WO 00/64065 | 10/2000 |

OTHER PUBLICATIONS

Essam Sourour, Gregory Bottomley and Rajaram Ramesh, "Delay Tracking For Direct Sequence Spread Spectrum Systems In Multipath Fading Channels," 1999 IEEE, Ericsson Inc., Page 422-426.

Akio Aoyama et al., "Path-search Performance of DS-CDMA System in Laboratory and Field Experiments.", Technical Report of The Institute of Electronics, Information and Communication Engineers (IEICE), RCS97-164, (Nov. 1997), pp. 51-58, C&C Media Research Lab., NEC Corporation.

* cited by examiner

*Primary Examiner*—Mohammed Ghayour
*Assistant Examiner*—Pankaj Kumar
(74) *Attorney, Agent, or Firm*—Foley & Lardner LLP (57) ABSTRACT

A multi-path detection circuit can improve path detection accuracy in the environment where the path is located close in the extent of one chip in the multi-path detection circuit of CDMA type receiver unit. The multi-path detection circuit has generating means for generating a logic pattern of a correlated peak in the delay profile, and removing means for removing a power component of the detected correlated peak from the delay profile using the logical pattern of the correlated peak generated by the generating means.

26 Claims, 11 Drawing Sheets

IN CASE OF ONE PATH

FIG. 5B

IN CASE OF THREE PATH WITH WIDE INTERVAL

FIG. 5C

IN CASE OF THREE PATH WITH NARROW INTERVAL

PATTERN GENERATION CIRCUIT, MULTI-PATH DETECTION CIRCUIT EMPLOYING THE SAME AND MULTI-PATH DETECTION METHOD

BACKGROUND OF THE INVENTION

1. Field of the Invention

The present invention relates to a pattern generation circuit, a multi-path detection circuit employing the same and a multi-path detection method. More particularly, the invention relates to a detection method of a multi-path position for determining a reception timing of a finger of a RAKE receiver employed in a code division multiple access (CDMA) system (spread spectrum system).

2. Description of the Related Art

Conventionally, as a path timing detection circuit of this kind, there is a circuit to be realized by measuring a delay profile of a propagation path by correlating operation of a reception signal and a spread code using a sliding correlator or matched filter and by detecting a correlation peak amount of the delay profile.

However, when intervals of respective multi-path is narrow, a plurality of paths can overlap on the delay profile to make it difficult to detect correct path position.

Figure 5A:
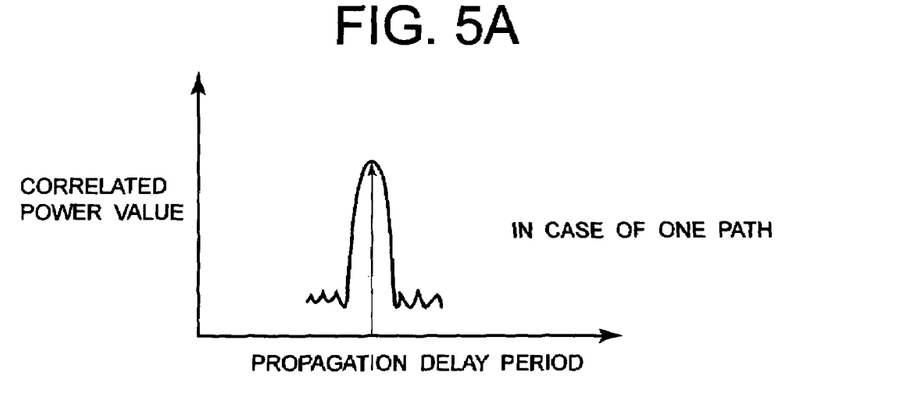
FIG. 5A is an illustration showing a delay profile in case of one path.
Figure 5B:
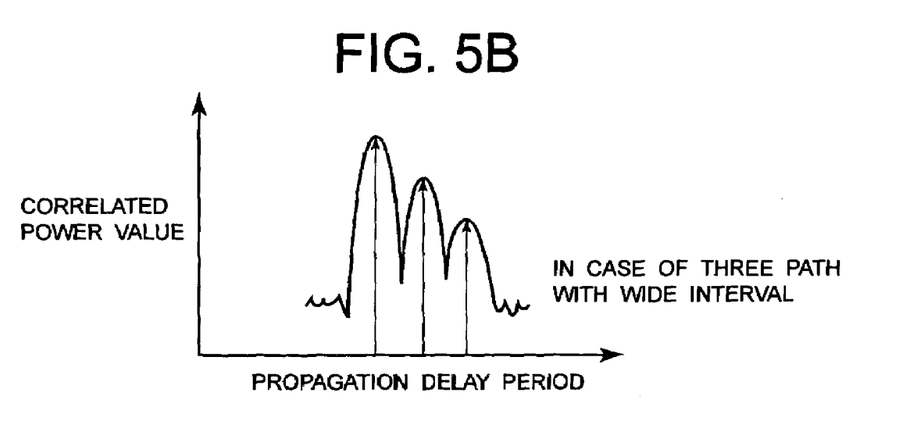
FIG. 5B is an illustration of a delay profile in the case where intervals of three paths are relatively wide.
Figure 5C:
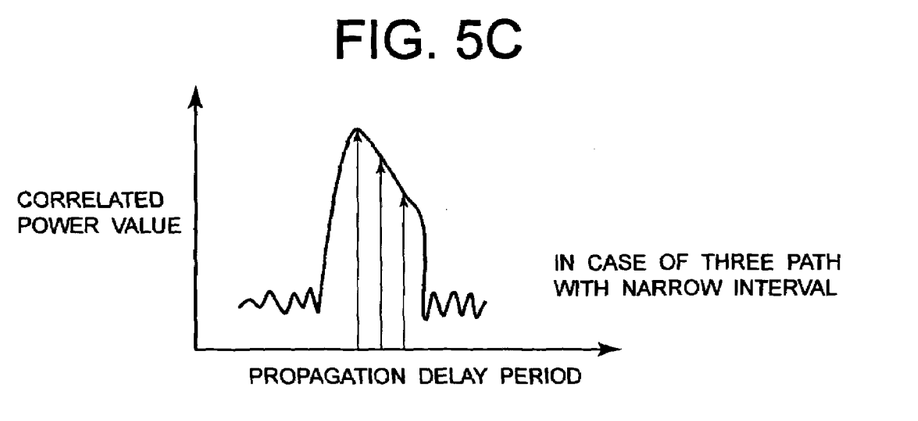
FIG. 5C is an illustration of a delay profile in the case where intervals of three paths are narrow.

For example, in an example of the delay profile shown in FIGS. 5A to 5C, when only one path is present, a shape of the path has a width as illustrated in FIG. 5A. On the other hand, when a plurality of paths are present, if paths have enough interval as shown in FIG. 5B, a plurality of paths can be identified.

However, when interval of the paths is small as shown in FIG. 5C, paths cause overlap to make it impossible to identify which sample point is the accurate path position. When the path position cannot be detected accurately, reception performance is degraded significantly.

In such case, in the prior art, it has been employed a method to set a minimum interval of respective finger position by omitting N samples (N is integer) before and after the detected path from next peak detection. Such method has been disclosed in "Path-Search Performance of DS-CDMA System in Laboratory and Field Experiments" (Aoyama et al.: Technical Report of IEICE, ROS 97–164, 1997–11) (hereinafter referred to as publication 1).

However, in the foregoing method, it is required to preliminarily determine the minimum interval of the paths to detect. Also, in the foregoing method, the detected path position may be determined depending upon the set value to cause difficulty in detecting accurate timing.

Namely, in the foregoing publication 1, when the interval between the paths is narrow to overlap the paths, the N samples before and after the detected path are masked to omit from next peak detection, pseudo peak may appear in the pattern from which the N samples before and after the detected path are omitted, to cause difficult in detection of the accurate timing.

SUMMARY OF THE INVENTION

The present invention has been worked out in view of the problems set forth above. It is therefore an object of the present invention to provide a pattern generation circuit which can enhance precision in detection of each path timing and thus can obtain more stable reception performance, a multi-path detection circuit and a multi-path detection method employing the same.

According to the first aspect of the present invention, a pattern generating circuit comprises:

generating means for generating a logical pattern of correlated peak in a delay profile of a transmission path; and removing means for removing a power component of the detected correlated peak from the delay profile using the logical pattern of the correlated peak generated by the generating means.

According to the second aspect of the present invention, a multi-path detection circuit for detecting a timing of multi-path by measuring a delay profile of a transmission path, comprises generating means for generating a logic pattern of a correlated peak in the delay profile; and detection means for detecting position of the correlated peak on the basis of the logical pattern of the correlated peak generated by the generating means.

According to the third aspect of the present invention, a multi-path detection circuit comprises:

a matched filter outputting a correlated value of a spread code and a received signal;

delay profile storing means for storing a delay profile of a transmission path measured by the matched filter;

maximum value retrieving means for retrieving a maximum peak position and a peak level from the delay profile stored in the delay profile storing means;

pattern generating means for sequentially generating logical patterns of correlated peaks on the basis of the leak level and peak position obtained from the maximum value retrieving means; and preparing means for preparing a profile removed a correlation power of the peak retrieved at preceding time by the maximum value retrieving means;

the maximum peak value and the peak level being retrieve sequentially from the profile generated by the generating means.

According the forth aspect of the invention, a multi-path detection method for detecting a timing of multi-path by measuring a delay profile of a transmission path, comprises the steps of:

generating a logical pattern of a correlated peak in a delay profile; and detecting a position of correlated peak on the basis of the generated logical pattern of the correlated peak.

Namely, the multi-path detection circuit according to the present invention is to improve path detection accuracy in the environment where the path is located close in the extent of one chip in the multi-path detection circuit of CDMA type receiver unit.

Therefore, a multi-path detection circuit has generating means for generating a logic pattern of a correlated peak in the delay profile, and removing means for removing a power component of the detected correlated peak from the delay profile using the logical pattern of the correlated peak generated by the generating means.

More particularly, the multi-path detection circuit according to the present invention, has a matched filter outputting a correlated value of a spread code and a received signal, delay profile storing means for storing a delay profile of a transmission path measured by the matched filter, maximum value retrieving means for retrieving a maximum peak position and a peak level of the first correlated peak from the delay profile stored in the delay profile storing means, pattern generating means for generating logical patterns (logical shape) of the first correlated peak on the basis of the leak level and peak position of the first correlated peak obtained from the maximum value retrieving means, and a substractor substracts the logical pattern of the first correlated peak from the delay profile data stored in the delay profile storage portion upon detecting the second correlated peak.

With raking the construction set forth above, a profile removed the correlated power of the first correlated peak is prepared by the substractor upon detecting the second correlated peak to store in the delay profile storage portion. Subsequently, the maximum value retrieving portion outputs the maximum peak position and the peak level to obtain the peak level and the peak position of the second correlated peak. The pattern generating portion generates the logical pattern of the second correlated peak on the basis of the peak level and the peak position of the second correlated peak.

The substractor subtracts the logical pattern of the second correlated peak from the delay profile data stored in the delay profile storage portion to generate a profile removed the correlated power of the second correlated peak to store. The foregoing operation is counted by the counter to repeat for a predetermined number to retrieve a plurality of correlated peak.

Accordingly, even when the interval of the correlated peaks (path) is narrow to cause overlap on the delay profile, the multi-path can be precisely separated into each individual path to enable detection of the correlated peak position to improve reception performance.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific detailed. In the other instance, well known structure are not shown in detail in order to avoid unnecessary obscurity of the present invention.

Figure 1:
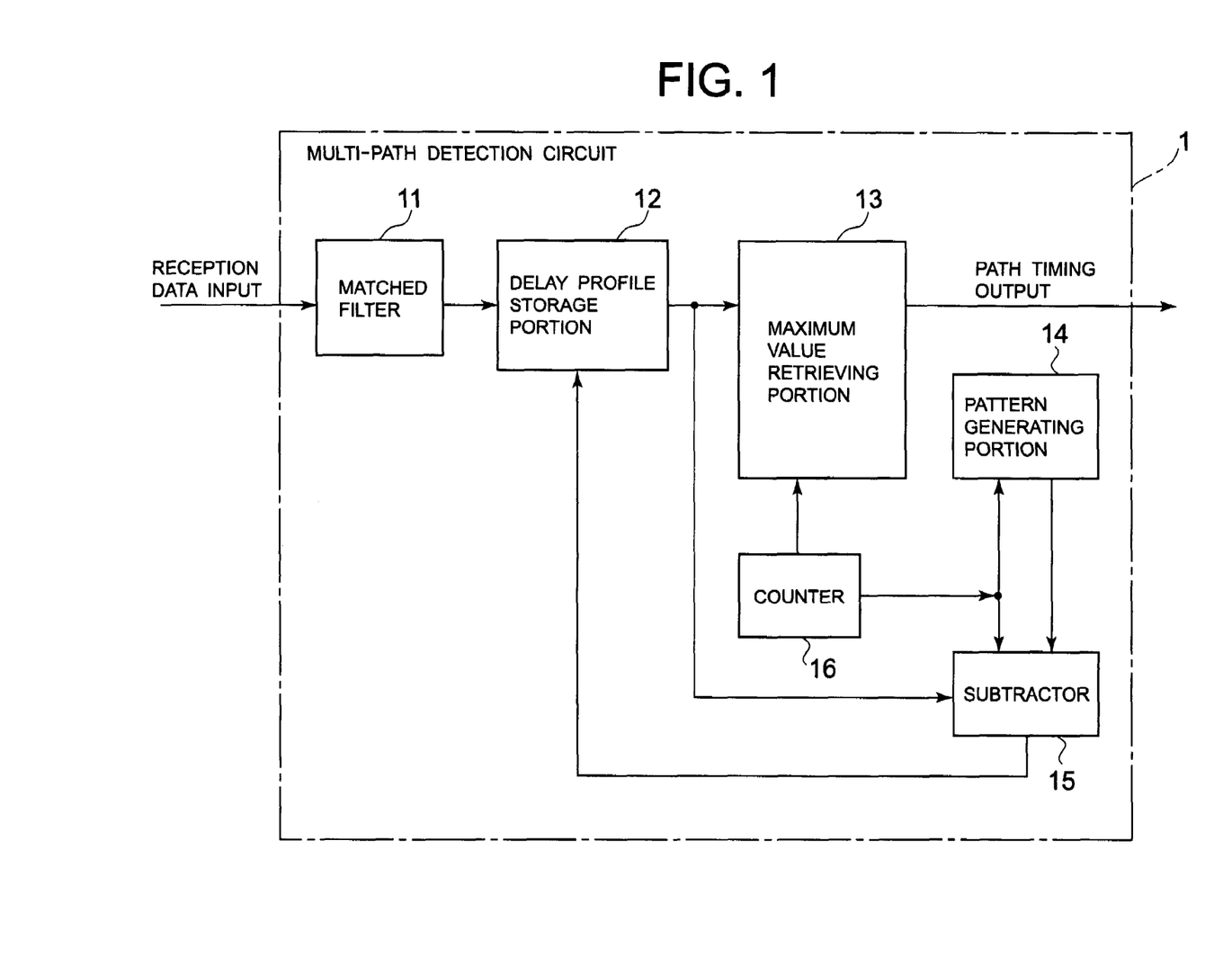
FIG. 1 is a block diagram showing a construction of one embodiment of a multi-path detection circuit according the present invention.

FIG. 1 is a block diagram showing a construction of one embodiment of a multi-path detection circuit according to the present invention. As shown in FIG. 1, the shown embodiment of the multi-path detection circuit 1 is constructed with a matched filter 11, a delay profile storage portion 12, a maximum value retrieving portion 13, a pattern generating portion 14, a subtractor 15 and a counter 16.

The multi-path detection circuit 1 has the matched filter 11 outputting a correlation value of a spread code and a received signal. A delay profile of a propagation path (not shown) measured by the matched filter 11 is fed to the delay profile storage portion 12 to be stored therein.

A first correlated peak (path) can be obtained by outputting a maximum peak position and a peak level from the delay profile by the maximum value retrieving portion 13. The pattern generating portion 14 generates a logical pattern of the first correlated peak on the basis of the peak level and the peak position of the first peak obtained from the maximum value retrieving portion 13.

Upon detecting the second correlated peak, the subtractor 15 subtracts the logical pattern of the first correlated peak from the delay profile data in the delay profile storage portion 12 to prepare a profile from which is removed a correlated power of the first correlated peak and stores the prepared profile in the delay profile storage portion 12. It should be noted that the subtractor 15 may be replaced with other means, such as shift register or the like as long as the profile from which is removed the correlated power of the first correlated peak can be generated.

Thereafter, the maximum value retrieving portion 13 outputs the maximum peak position and the peak level to obtain the peak level and the peak position of the second correlated peak. The pattern generating portion 14 generates the logical pattern (logical shape) of the second correlated peak on the basis of the peak level and the peak position of the second correlated peak.

The subtractor 15 subtracts the logical pattern of the second correlated peak from the delay profile data stored in the delay profile storage portion 12 to prepare the profile from which is removed the correlated power of the second correlated peak. Then, the prepared profile is stored in the delay profile storage portion 12.

By repeating the foregoing operation for number of times to be measured by the counter 16, a plurality of correlated peak can be retrieved. Accordingly, even if the multi-path having narrow interval between adjacent correlated peaks to cause overlapping on the delay profile, the multi-paths can be separated into respective of the correlated peaks with high precision to enable detection of the correlated peak position. Thus, reception performance can be improved.

Figure 2:
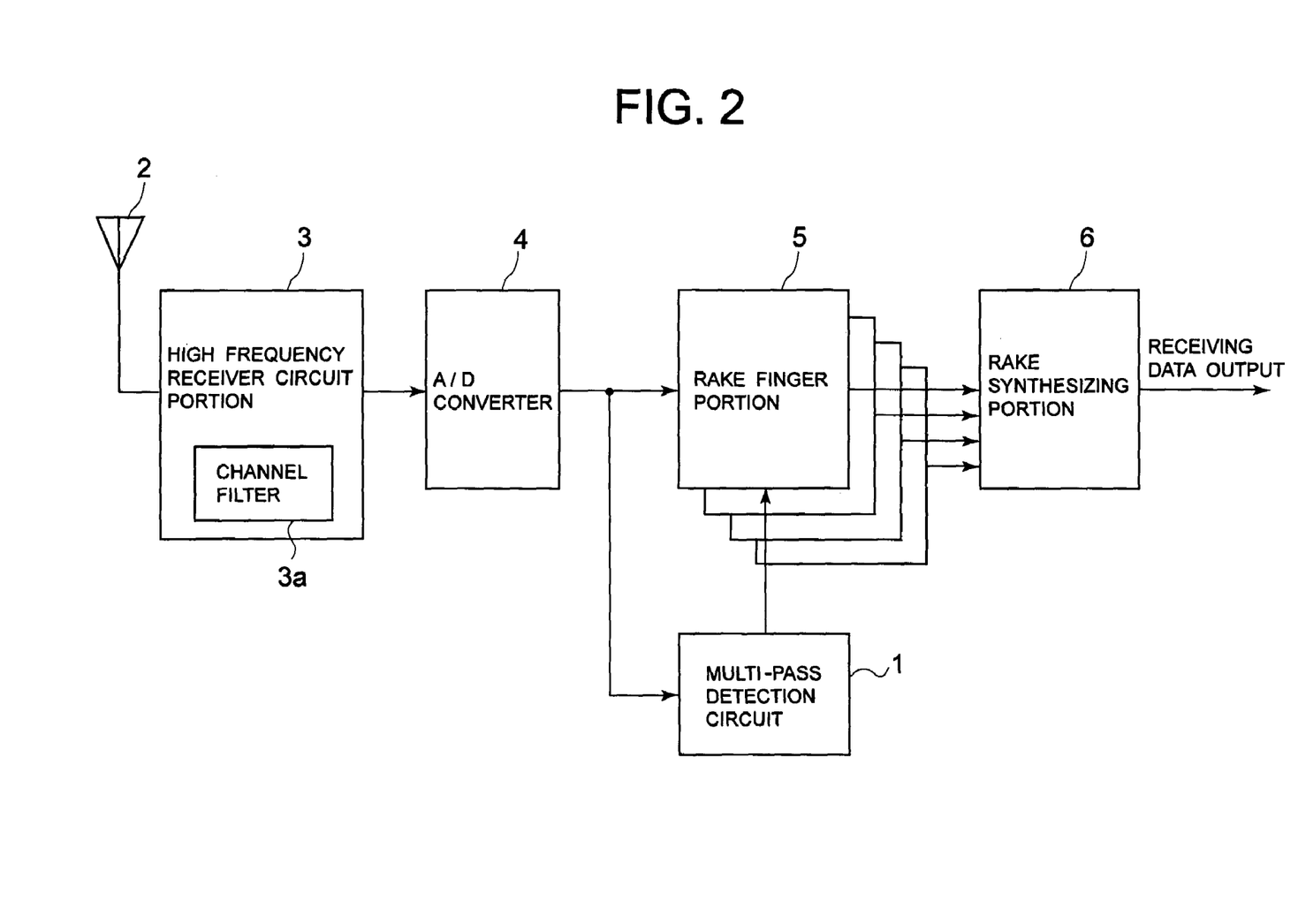
FIG. 2 is a block diagram showing a construction of one embodiment of a CDMA receiver unit according to the present invention.

FIG. 2 is a block diagram showing one embodiment of the CDMA receiver according to the present invention. In FIG. 2, one embodiment of the CDMA receiver according to the present invention is constructed with an antenna portion 2, a high frequency reception circuit portion (radio portion) 3, an analog-to-digital (A/D) converter 4, a RAKE finger portion 5, a RAKE synthesizing portion 6 and the multi-path detection circuit 1. The multi-path detection circuit 1 has the construction as shown in FIG. 1. The high frequency reception circuit portion 3 is provided with a channel filter 3*a* to be used for band restriction with a not shown base station.

The data transmitted as radio wave is received by the antenna portion 2, then is subjected to frequency conversion (down conversion) by the high frequency reception circuit portion 3 and is converted from the analog signal into digital signal by the A/D converter 4.

The signal from the A/D converter 4 is supplied to the multi-path detection circuit 1 for measuring the delay profile of a transmission path and timing of the multi-path is detected. The output of the multi-path detection circuit 1 is used as a reception timing input of the RAKE finger portion 5. Data received at respective timing are synthesized by the RAKE Synthesizing portion 6.

The multi-path detection circuit 1 has the matched filter 11 outputting the correlated value of the spread code and the received signal. By this, the measured delay profile of the transmission path is stored in the delay profile storage portion 12.

The first correlated peak (path) can be obtained by outputting a maximum peak position and a peak level from the delay profile by the maximum value retrieving portion 13. The pattern generating portion 14 generates a logical pattern of the correlated peak on the basis of the peak level and the peak position of the first correlated peak obtained from the maximum value retrieving portion 13. At this time, the reference pattern (peak shape of one path of the peak level 1) used in the logical pattern of the correlated peak can be arithmetically derived on the basis of a coefficient used in the channel filter 3*a*. From the reference pattern, the logical pattern of the correlated peak is generated on the basis of the peak level and the peak position of the correlated peak.

Upon detecting the second correlated peak, the subtractor 15 subtracts the logical pattern of the first correlated peak from the delay profile data in the delay profile storage portion 12 to prepare a profile from which is removed a correlated power of the first correlated peak and stores the prepared profile in the delay profile storage portion 12.

Thereafter, the maximum value retrieving portion 13 outputs the maximum peak position and the peak level to obtain the peak level and the peak position of the second correlated peak. The pattern generating portion 14 generates the logical pattern of the second correlated peak on the basis of the peak level and the peak position of the second correlated peak.

The subtractor 15 subtracts the logical pattern of the second correlated peak from the delay profile data stored in the delay profile storage portion 12 to prepare the profile from which is removed the correlated power of the second correlated peak. Then, the prepared profile is stored in the delay profile storage portion 12. By repeating the foregoing operation for number of times, a plurality of correlated peak can be retrieved. It should be noted that the number of times is measured by the counter 16.

Figure 3:
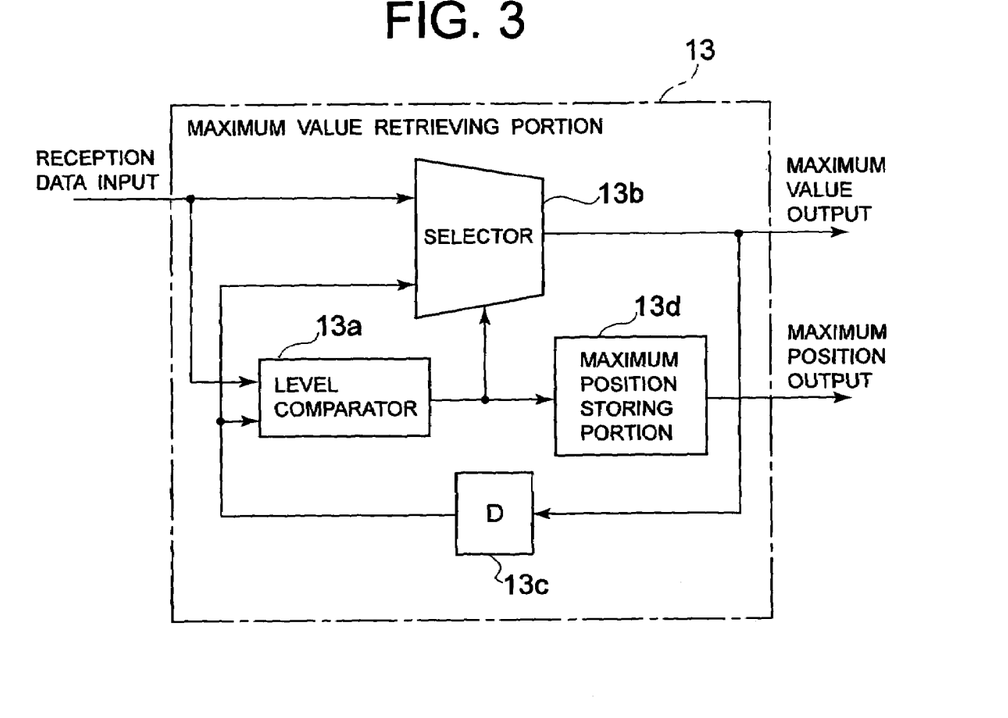
FIG. 3 is a block diagram showing an example of a construction of a maximum value retrieving portion of FIG. 1.

FIG. 3 is a block diagram showing a construction of the maximum value retrieving portion 13 of FIG. 1. In FIG. 3, the maximum value retrieving portion 13 is constructed with a level comparing portion 13*a*, a selector 13*b*, a buffer portion(D) 13*c* and a maximum position storage portion 13*d*.

The level comparing portion 3*a* compares the samples of the delay profile data with the interim maximum value in the retrieved samples. The selector 13*b* selects the same sample of the delay profile data or the interim maximum value depending upon the result of compariseon of the level comparing portion 3*a*.

The buffer portion 13*c* holds an interim maximum value during maximum value retrieval. The maximum position storage portion 13*d* holds a sample position when the level comparing portion 13*a* detects new maximum value to output the maximum peak position. In the construction set forth above, all samples of the delay profile data are retrieved sequentially. At the end of search, the maximum value among all samples is stored in the buffer portion 13*c*.

Figure 4:
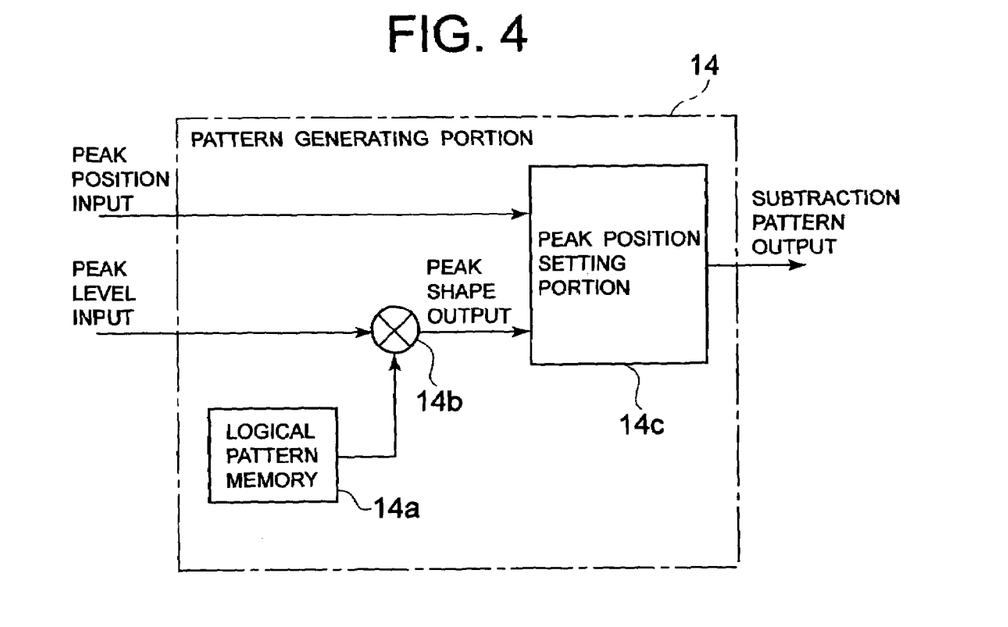
FIG. 4 is a block diagram showing an example of a pattern generating portion of FIG. 1.

FIG. 4 is a block diagram showing a construction of the pattern generating portion 14 of FIG. 1. In FIG. 4, the pattern generating portion 14 is constructed with a logical pattern memory 14*a*, a multiplier 14*b* and a peak position setting portion 14*c*.

The logical pattern memory 14*a* holds a preliminarily set reference pattern. The multiplier 14*b* sets a peak level using the reference pattern stored in the logical pattern memory 14*a*. The peak position setting portion 14*c* sets the position of the correlated peak from a peak position input and a peak shape output (logical pattern) from the multiplier 14*b*. The multiplier 14*b* may be any other means, such as adder or the like as long as the peak level can be set using the reference pattern.

Figure 7A:
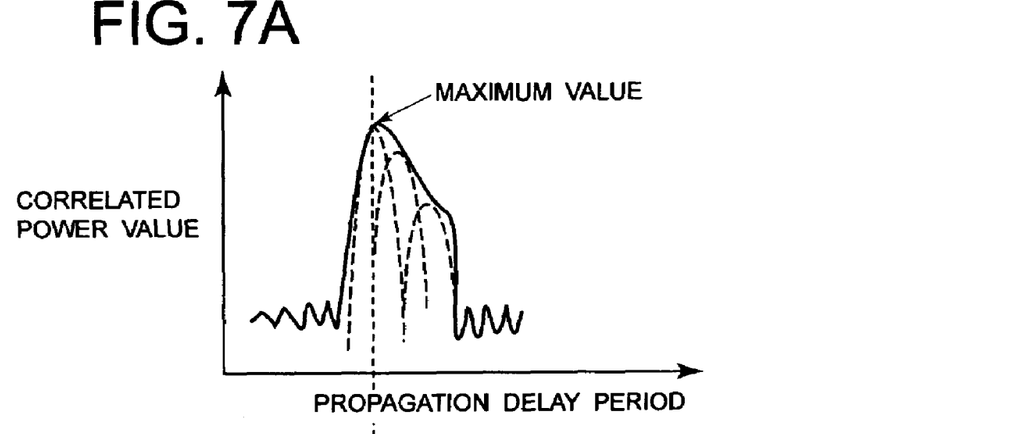
FIGS. 7A to 7C are operation image of respective process for the delay profile data stored in a delay profile storage portion of FIG. 1.
Figure 7B:
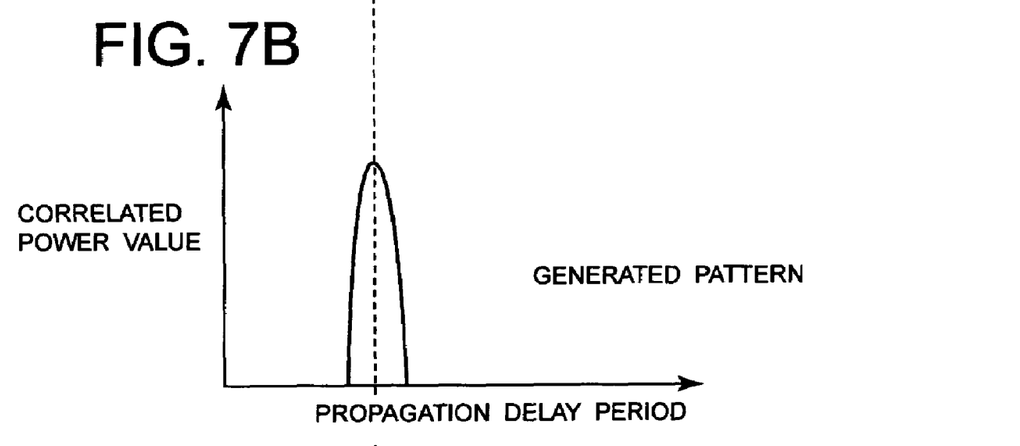

The logical pattern memory 14*a* may be realized by storing the reference pattern indicative of the logical pattern of the correlated peak [the peak shape upon one path as shown in FIG. 7A] as set at peak level 1 in read-only-memory (ROM) or the like.

By removing the power of the detected peak obtained by the pattern generating portion 14, detection of the next correlated peak becomes possible. A timing information of the multi-path thus obtained is supplied to the RAKE finger portion 5.

With the construction set forth above, as shown in FIG. 5C, even in multi-path environment where the path interval is narrow to cause overlap of the delay profile, the correlated peak position can be detected with high precision to improve reception performance.

It should be noted that the matched filter 11 is well known to those skilled in the art as means for measuring the delay profile. Therefore, detailed description therefor will be omitted for keeping the disclosure simple enough to facilitate clear understanding of the present invention. It should be noted that a sliding correlator may also be employed in place of the matched filter 11. Similarly, the RAKE finger portion 5 and the RAKE synthesizing portion 6 are well known to those skilled in the art, and are not directly related to the present invention. Therefore, detailed description therefor will be omitted for keeping the disclosure simple enough to facilitate clear understanding of the present invention.

FIGS. 5A to 5C are illustration showing examples of the delay profiles. FIG. 5A shows the delay profile in case of one path. FIG. 5B shows the delay profile in the case where interval between three paths is relatively wide. FIG. 5*c* shows the delay profile in the case where interval between three paths is narrow.

Figure 6:
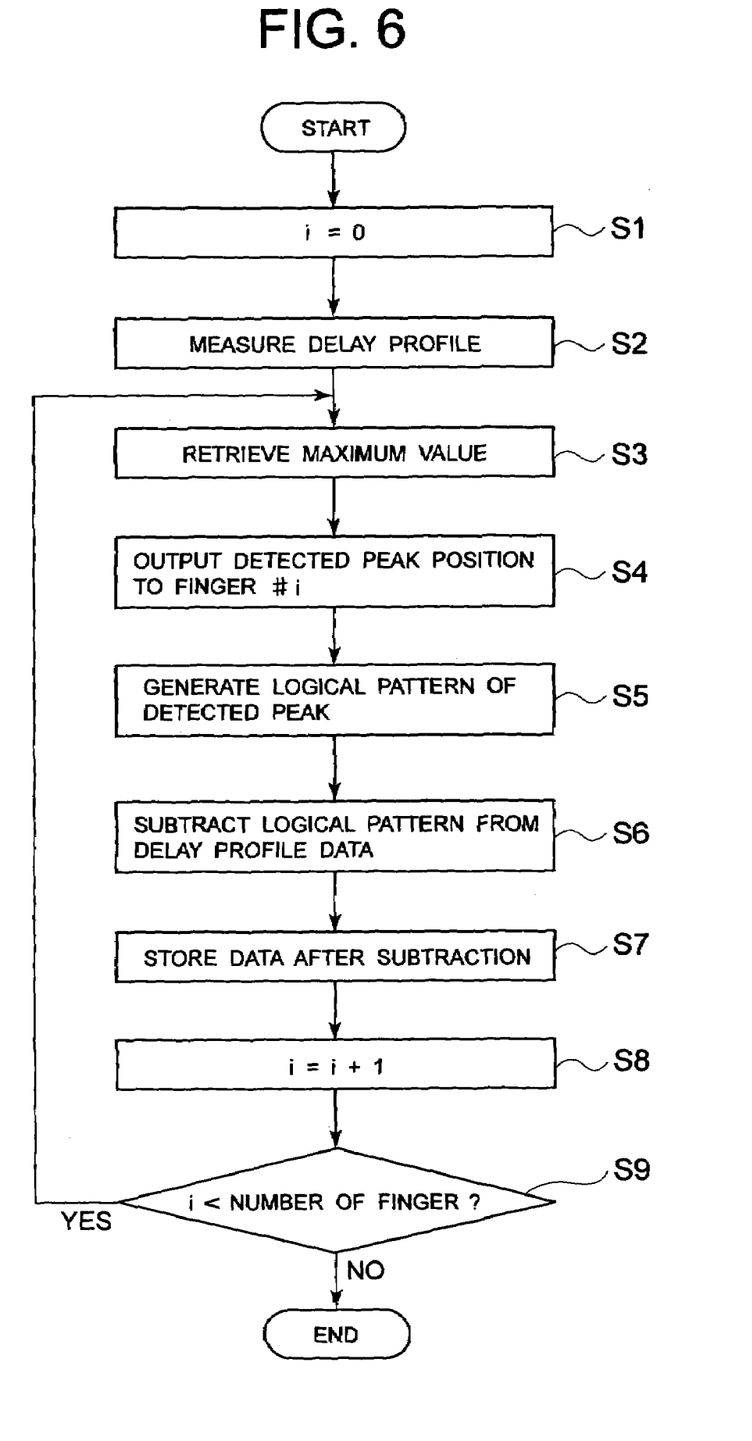
FIG. 6 is a flow chart showing an operation of the multi-path detection circuit of FIG. 1.

FIG. 6 is a flowchart showing operation of the multi-path detection circuit 1 of FIG. 1, and FIGS. 7A to 7C are illustration showing operation images of respective process for the delay profile data stored in the delay profile storage portion 12. It should be noted that the operation shown in FIG. 6 is realized by executing a program of a not shown control memory by the multi-path detection circuit 1. As the control memory, ROM, integrated circuit (IC) memory and so forth may be used.

With reference to FIGS. 1 to 7C, operation of one embodiment of the present invention will be discussed. Here, discussion will be given for the case where the path interval is narrow and delay profiles of a plurality of correlated peaks overlap as shown in FIG. 5C.

FIG. 5A shows an example of the correlated peak in the case where only one path is present and only one correlated peak is present. The shape of the correlated peak has a width by a reception filter characteristics.

FIG. 5B shows an example of the delay profile in which three correlated peaks are present with interval about two chips. When the correlated peaks have sufficient interval as shown, presence of the three correlated peaks is definite.

FIG. 5C shows an example of the case in which three correlated peaks are present with interval about one chip. Since respective paths overlap to make respective peak position indefinite. Therefore, accurate detection of the position of the correlated peak is difficult in the conventional method.

Next, discussion will be given for operation of the multi-path detection circuit 1. In the multi-path detection circuit 1, at first, the counter 16 counting number of detected peaks is reset (step S1 of FIG. 6). Subsequently, in the multi-path detection circuit 1, the delay profile is measured by the matched filter 11 (step S2 of FIG. 6). An example of the delay profile measured by the matched filter 11 is shown in FIG. 7A.

Thereafter, maximum value retrieval is performed by the maximum value retrieving portion 13 (step S3 of FIG. 6). The maximum value retrieving portion 13 outputs the detected path timing (correlated peak position) to the RAKE finger portion 5 (step S4 of FIG. 6). The pattern generating portion 14 generates the logical pattern [see FIG. 7B] of the detected peak on the basis of the maximum value and the peak position information detected by the maximum value retrieving portion 13 (step S5 of FIG. 6).

Figure 7C:
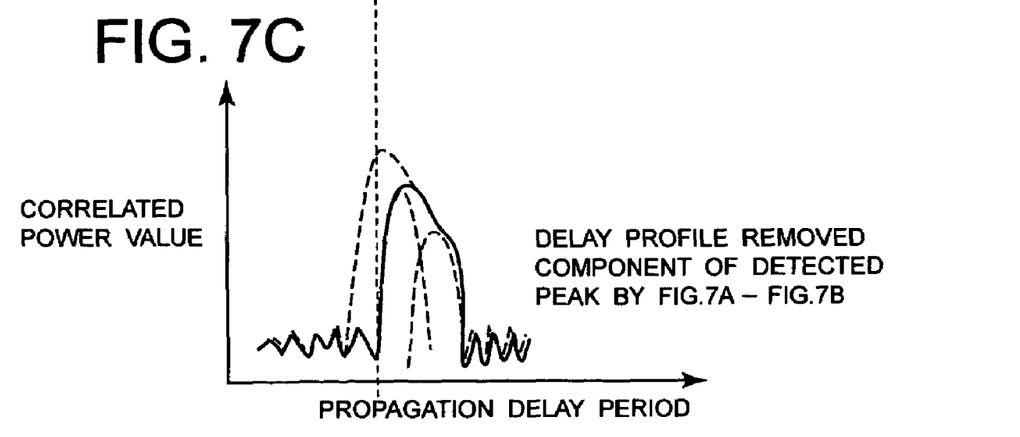

The subtractor 15 subtracts the logical pattern generated by the pattern generating portion 14 from the delay profile data [see FIG. 7c] to remove the power component of the detected peak from the delay profile data (step S6 of FIG. 6).

The delay profile storage portion 12 stores data removed the power component of the detected peak from the delay profile data by the subtractor 15 (step S7 of FIG. 6). After completion of this process, the counter 16 is counted up (step S8 of FIG. 6). By repeating the foregoing process for the times corresponding to number of fingers (step S9 of FIG. 9), necessary number of peaks can be detected.

As set forth above, even in the multi-path environment where the correlated peaks of the delay profiles are over-lapped, the multi-path detection circuit 1 can detect timing of respective path at high precision. Therefore, reception performance can be improved.

Figure 8:
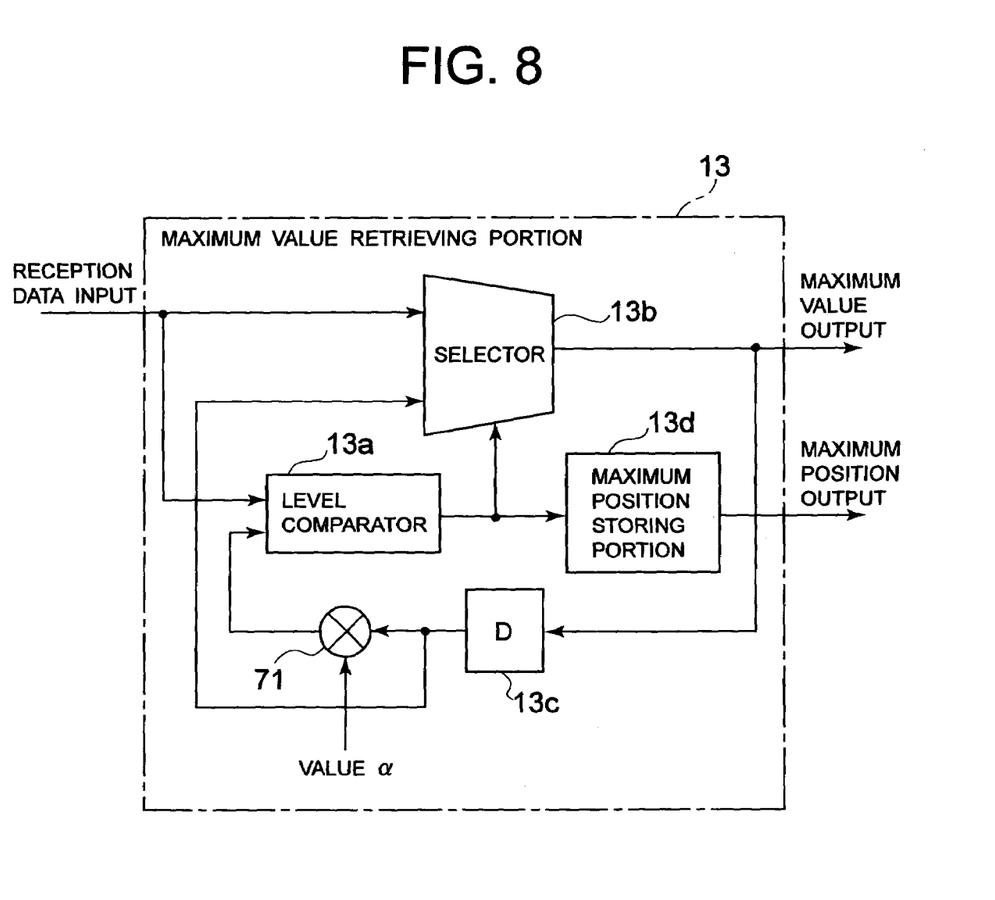
FIG. 8 is a block diagram showing a construction of a maximum value retrieving portion of another embodiment of the multi-path detection circuit according to the present invention.

FIG. 8 is a block diagram showing a construction of the maximum value retrieving portion of another embodiment of the multi-path detection circuit according to the present invention. In FIG. 8, another embodiment of the present invention has the same construction as the maximum value retrieving portion 13 in the former embodiment of the present invention shown in FIG. 3 except for a coefficient multiplying portion 71 is provided in the maximum value retrieving portion 13. Like components to those in the former embodiment will be identified by like reference numerals and detailed description therefor will be omitted for avoiding redundant discussion and whereby to keep the disclosure simple enough to facilitate clear understanding of the present invention.

It should be noted that the basic construction of another embodiment of the multi-path detection circuit according to the present invention is the same as the construction of the multi-path detection circuit in the former embodiment shown in FIG. 1. Therefore, detailed description therefor will be omitted for avoiding redundant discussion and whereby to keep the disclosure simple enough to facilitate clear understanding of the present invention.

In FIG. 8, the maximum value retrieving portion 13 is constructed with the level comparing portion 13a, the selector 13b, buffer portion 13c, maximum position storage portion 13d and coefficient multiplying portion 71.

The level comparing portion 13a compares the sample of the delay profile data with the interim maximum value in the retrieved samples. The selector 13b selects the sample of the delay profile data and the interim maximum value depending upon the result of comparison of the level comparing portion 13a. The buffer portion 13c stores the interim maximum value during maximum value retrieval.

In the construction set forth above, all sample of the delay profile data is retrieved sequentially. At the end of search, the maximum value among all samples is stored in the buffer portion 13c. The maximum position storage portion 13d holds a sample position when the level comparing portion 13a detects new maximum value to output the maximum peak position.

Here, the coefficient multiplying portion 71 multiples the maximum value among all samples stored in the buffer portion 13c with a preliminarily set given value a to output the product to the level comparing portion 13a and the selector 13b.

By this, upon detection of the maximum value, when a plurality of sample points having equivalent level as the maximum correlation level are present, the sample having the least delay period (left side of the delay profile) among these samples can be selected as maximum point of the samples (left side of the delay profile). It should be noted that coefficient multiplying portion 71 may be replaced with adder or the like as long as the sample having the least delay period can be taken as the maximum point.

Figure 9:
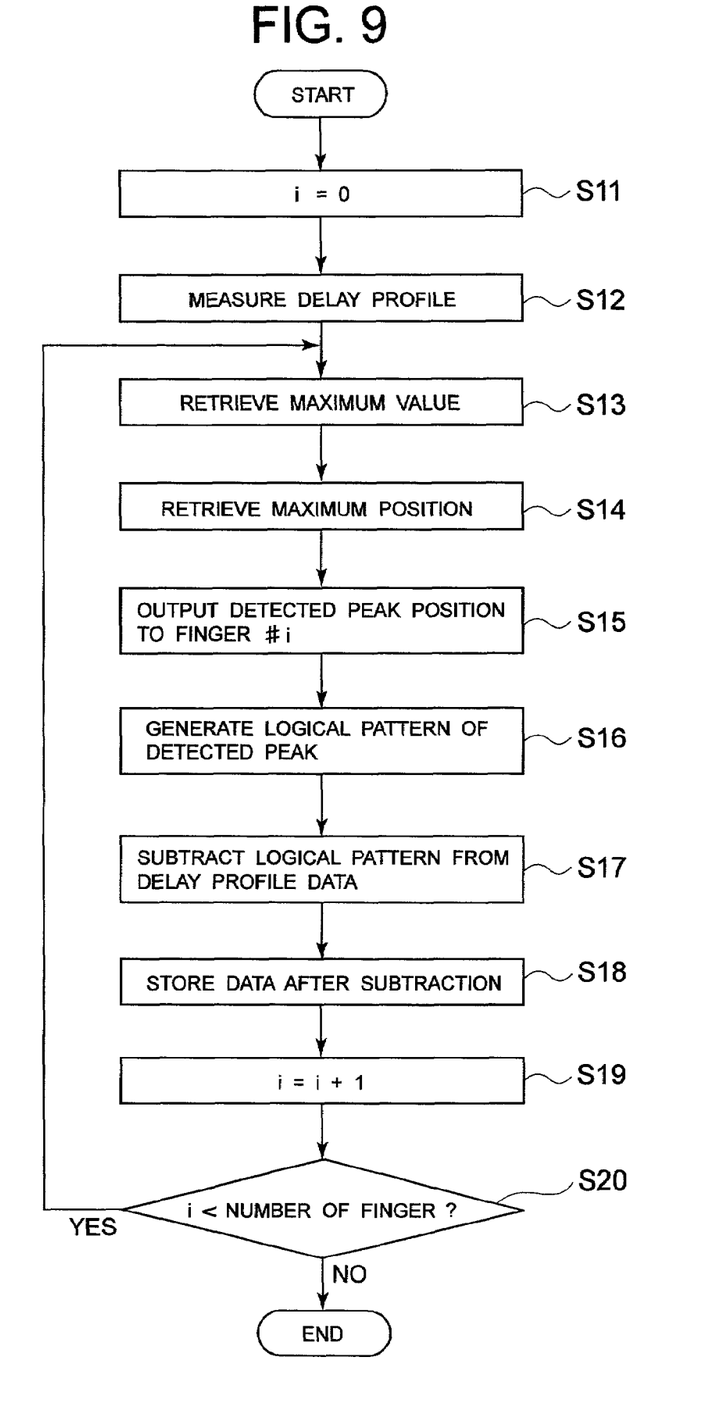
FIG. 9 is a flowchart showing operation of another embodiment of multi-path detection circuit according to the present invention.
Figure 10A:
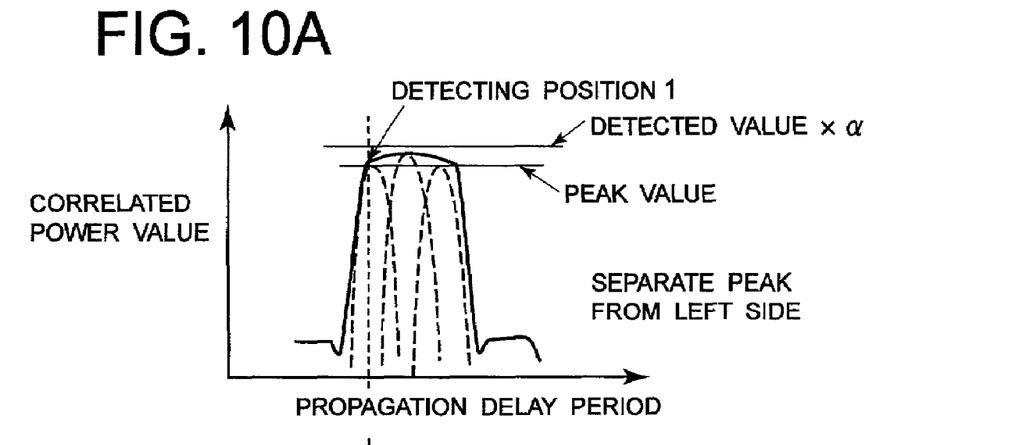
FIGS. 10A to 10C are illustration showing process operation in another embodiment of the present invention.
Figure 10B:
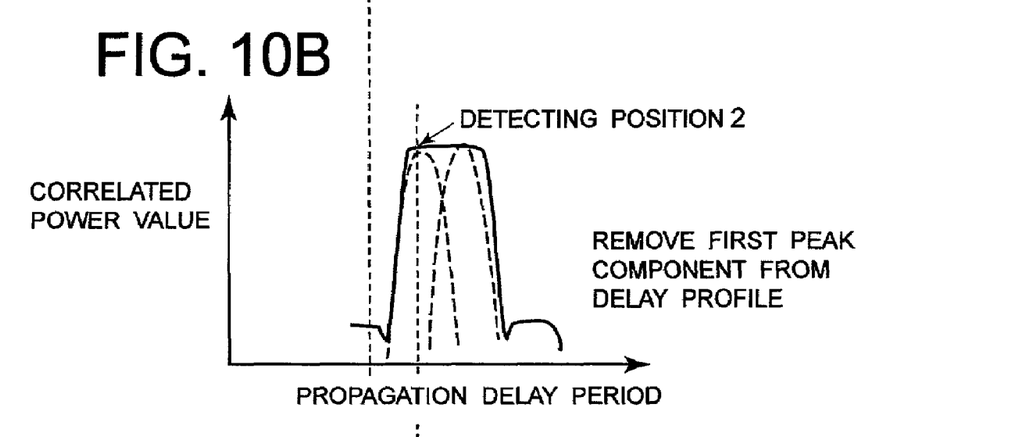
Figure 10C:
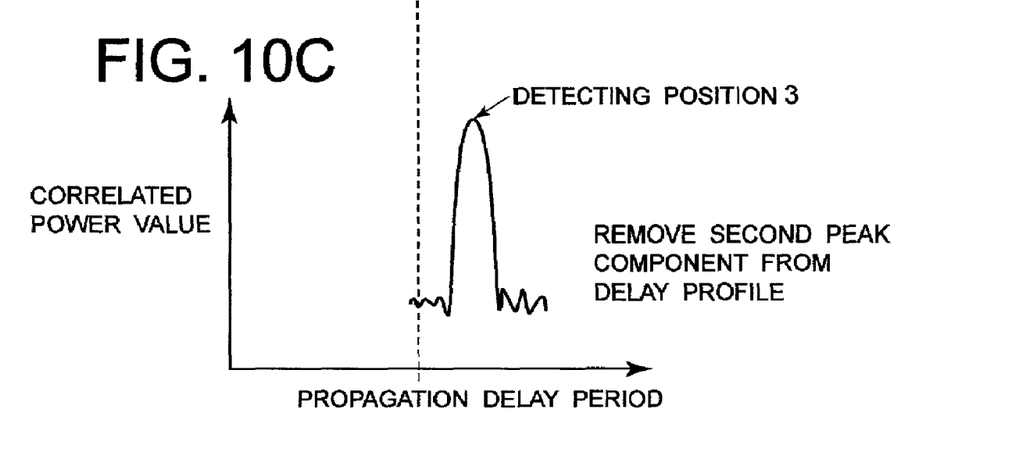

FIG. 9 is a flowchart showing operation of another embodiment of the multi-path detection circuit according to the present invention. FIGS. 10A to 10C show example of process operation by another embodiment of the present invention. Operation and effect of another embodiment of the multi-path detection circuit according to the present invention will be discussed with reference to FIGS. 8 to 10C.

It should be noted that the basic construction of another embodiment of the multi-path detection circuit according to the present invention is the same as the former embodiment of the multi-path detection circuit and the CDMA receiver shown in FIG. 1 and FIG. 2 according to the invention. Therefore, Like components to those in the former embodiment will be identified by like reference numerals and detailed description therefore will be omitted for avoiding redundant discussion and whereby to keep the disclosure simple enough to facilitate clear understanding of the present invention. On the other hand, the operation shown in FIG. 9 is realized by executing a program in the not shown control memory by the multi-path detection circuit 1. As the control memory, RON, IC memory or the like may be used.

Here, discussion will be given for the case where the path interval is narrow and delay profiles of a plurality of correlated peaks overlap as shown in FIG. 5C. FIG. 5C shows an example of the case in which three correlated peaks are present with interval about one chip. Since respective paths overlap to make respective peak position indefinite. Therefore, accurate detection of the position of the correlated peak is difficult in the conventional method.

In the multi-path detection circuit 1, at first, the counter 16 counting number of detected peaks is reset (step S11 of FIG. 9). Subsequently, in the multi-path detection circuit 1, the delay profile is measured by the matched filter 11 (step S12 of FIG. 9).

Thereafter, maximum value retrieval and maximum position retrieval are performed by the maximum value retrieving portion 13 (steps S13 and S14 of FIG. 9). The maximum value retrieving portion 13 outputs the path timing (correlated peak position) to the RAKE finger portion 5 (step S15 of FIG. 9). The pattern generating portion 14 generates the logical pattern of the detected peak on the basis of the maximum value and the peak position information detected by the maximum value retrieving portion 13 (step S16 of FIG. 9).

The subtractor 15 subtracts the logical pattern generated by the pattern generating portion 14 from the delay profile data to remove the power component of the detected peak from the delay profile data (step S17 of FIG. 9). The delay profile storage portion 12 stores data from which is removed the power component of the detected peak from the delay profile data by the subtractor 15 (step S18 of FIG. 9). After completion of this process, the counter 16 is counted up (step S19 of FIG. 9). By repeating the foregoing process for the times corresponding to number of fingers (step S20 of FIG. 9), necessary number of peaks can be detected.

As set forth above, even in the multi-path environment where the correlated peaks of the delay profiles are overlapped, the multi-path detection circuit 1 can detect timing of respective path at high precision. Therefore, reception performance can be improved.

FIG. 10A shows an example of the delay profile in which a plurality of paths are located close proximity and levels of respective paths are substantially equal. In this case, in the maximum value retrieving portion 13 of the one embodiment of the present invention, difficulty is encountered in making judgment which sample is to be the first correlated peak, in contrast to this, in the maximum value retrieving portion 13 of the shown embodiment, as the peak of the profile, the point at the left most position (detecting position 1) can be selected.

Therefore, the procedure shown in FIGS. 10B and 10C, namely by the procedure, in which the first peak component is removed from the delay profile to detect the detecting position 2, and subsequently the second peak component is removed from the delay profile to detect the detecting position 3, the power component of the detected peak is removed per one peak to separate all multi-path components to perform detection.

It should be noted that while the shown embodiment is designed to detect the peak located at the leftmost position, namely have the least delay period, as the profile peak sequentially, it is also possible to detect the peak located at the rightmost position, namely the peak having the most delay period as the profile peak for detecting the profile peaks sequentially by inverting the scanning direction.

Figure 11:
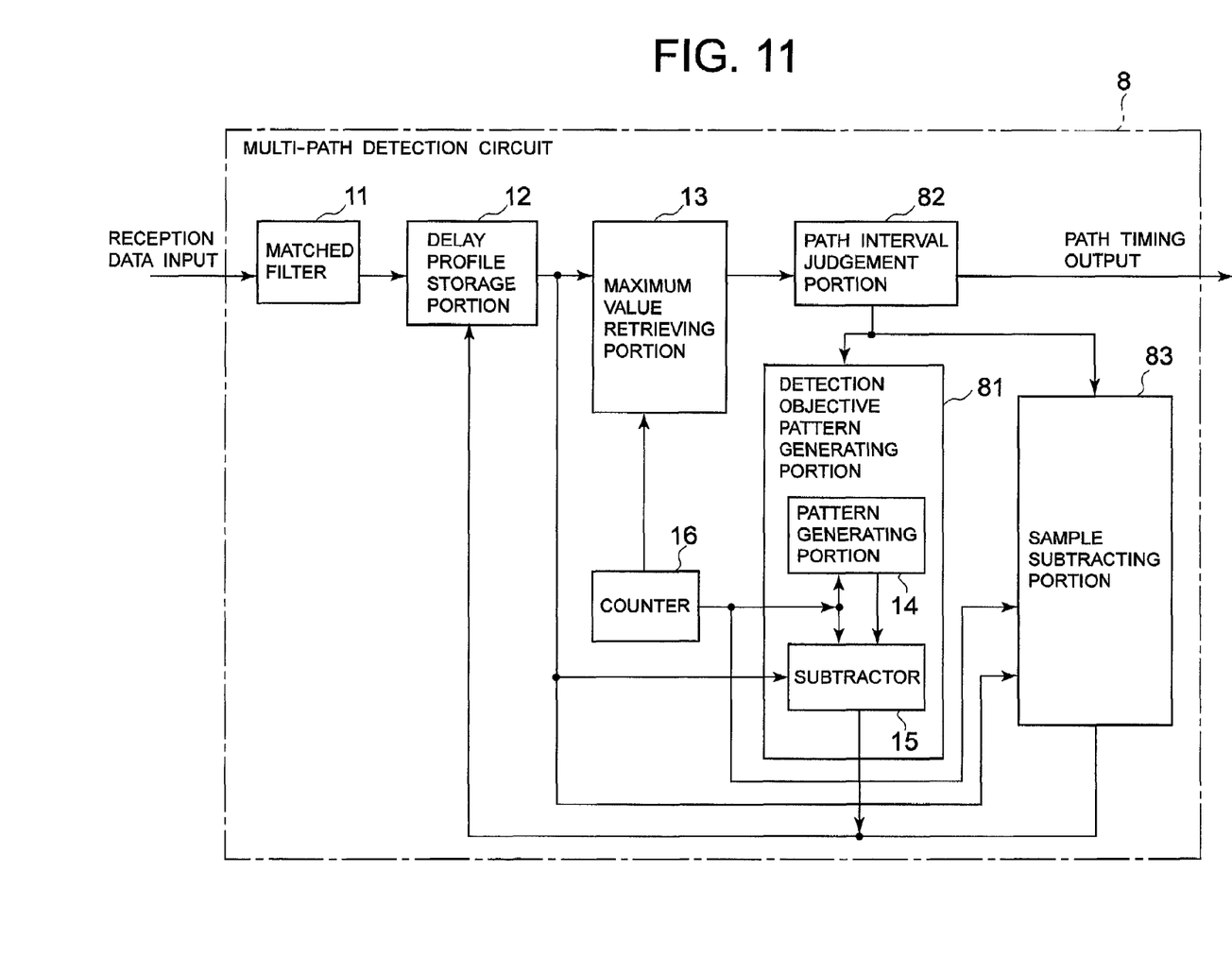
FIG. 11 is a block diagram showing a construction of the a further embodiment of the multi-path detection circuit according to the present invention.

FIG. 11 is a block diagram showing a further embodiment of the multi-path detection circuit according to the present invention. In FIG. 11, the further embodiment of the multi-path detection circuit 8 according to the present invention has the same construction as one embodiment of the multi-path detection circuit 1 shown in FIG. 1 except for presence of a path interval judgment portion 82 and a sample subtractiong portion 83. Like components to those in the former embodiment will be identified by like reference numerals and detailed description therefor will be omitted for avoiding redundant discussion and whereby to keep the disclosure simple enough to facilitate clear understanding of the present invention. Also, operations of the common components are the same as those in one embodiment of the invention. It should be noted that, in the multi-path detection circuit 8, a detection objective pattern generating portion 81 is formed by the pattern generating portion 14 and the subtractor 15.

The path interval judgment portion 82 makes judgment of interval of the path timing on the basis of the path timing output from the maximum value retrieving portion 13, to drive the detection objective pattern generating portion 81 when the interval of the path timing becomes smaller than a preliminarily set interval, and to drive the sample detecting portion 83 when the interval of the path timing becomes greater than the preliminarily set interval. It should be noted that the path interval judgment portion 82 outputs the path timing output from the maximum value retrieving portion 13 as is out of the multi-path detection circuit 8.

The pattern generating portion 14 and the subtractor 15 in the detection objective pattern generating portion 81 perform generating operation of the delay profile data to be an object for detection. On the other hand, the sample detecting portion 83 performs similar operation as the prior art. In the further embodiment of the present invention, pattern generating operation by the pattern generating portion 14 and the subtractor 15 is performed only for the multi-path, in which the delay profiles overlap.

Figure 12:
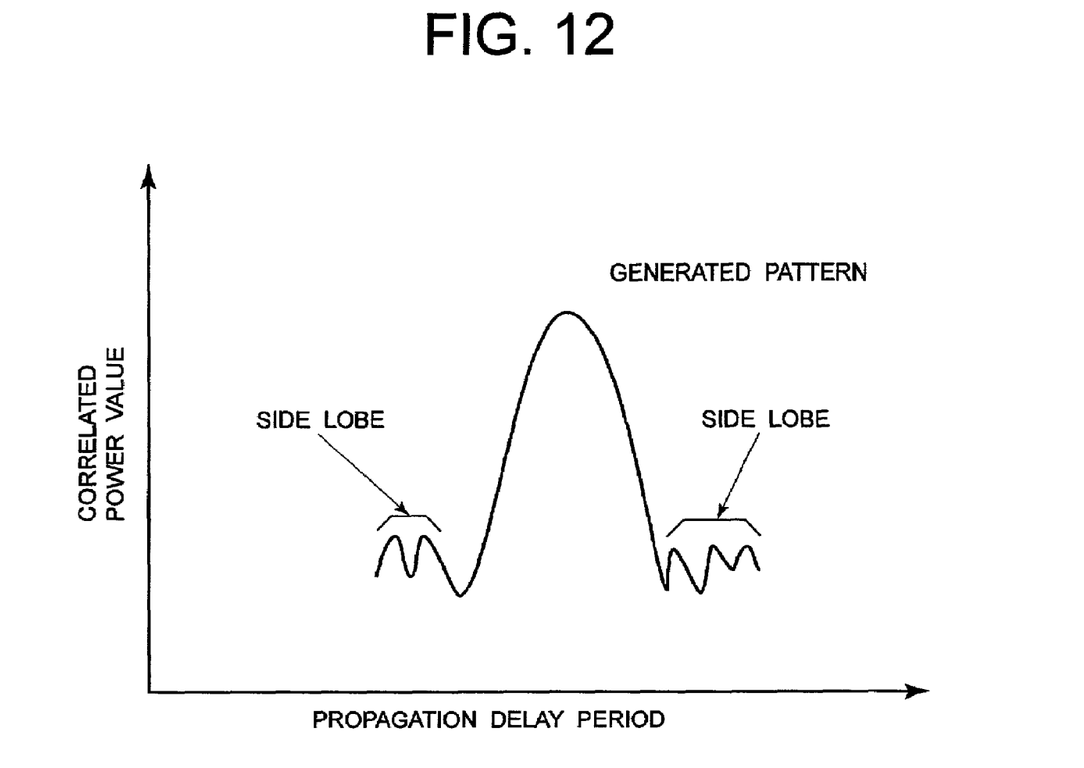
FIG. 12 is an illustration showing one example of a reference pattern to be used in the still further embodiment of the pattern generating portion according to the present invention.

FIG. 12 is an illustration showing one example of the reference pattern to be used in the pattern generating portion in the further embodiment of the present invention. In the delay profile, before and after the wave representative of the profile peak of one path, side lobe is generated to make interval between the correlated peak narrower to cause overlap of the delay profile, these side lobe may be included in the waveform.

Therefore, in the further embodiment of the present invention, upon generation of the reference pattern, the side lob portion is preliminarily prepared together with the profile peak to store as shown in FIG. 12. By this, the side lobe portion can be eliminated from the profile peak including the side lobe of adjacent profile. Thus, more accurate detection of the multi-path component becomes possible.

As set forth above, according to the present invention, in the multi-path detection circuit detecting the timing of the multi-path, the logical shape of the correlated peak in the delay profile is generated for detecting the correlated peak on the basis of the generated logical shape of the correlated peak to enhance precision in detection of the path timing in the multi-path environment where the correlated peaks overlap on the delay profile,to obtain better reception performance.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A pattern generating circuit comprising:
   generating means for generating a logical pattern of correlated peak in a delay profile of a transmission path; and
   removing means for sequentially removing a power component of the detected correlated peak from said delay profile using the logical pattern of said correlated peak generated by said generating means,
   wherein said removing means selects a sample having the least delay period as a maximum point among samples by multiplying a preliminarily set given value to the maximum value among all samples.

2. A pattern generating circuit as set forth in claim 1, wherein said logical pattern represent a peak shape in a single path of the delay profile.

3. A pattern generating circuit as set forth in claim 1, wherein said logical pattern represents the peak shape and side lobe contained therein in a single path of the delay profile.

4. A pattern generating circuit comprising:
   generating means for generating a logical pattern of correlated peak in a delay profile of a transmission path; and
   removing means for sequentially removing a power component of the detected correlated peak from said delay profile using the logical pattern of said correlated peak generated by said generating means,
   wherein said removing means selects a sample having the most delay period as a maximum point among samples by multiplying a preliminarily set given value to the maximum value among all samples.

5. A pattern generating circuit comprising:
   generating means for generating a logical pattern of correlated peak in a delay profile of a transmission path; and
   removing means for sequentially removing a power component of the detected correlated peak from said delay profile using the logical pattern of said correlated peak generated by said generating means,
   wherein said logical pattern is preliminarily generated on the basis of a coefficient set for a channel filter to be used for band restriction in said transmission path.

6. A multi-path detection circuit for detecting a timing of multi-path by measuring a delay profile of a transmission path, comprising:
   generating means for generating a logic pattern of a correlated peak in said delay profile; and
   detection means for detecting position of the correlated peak on the basis of the logical pattern of the correlated peak generated by said generating means,
   wherein said detection means selects a sample having the least delay period as a maximum point among samples by multiplying a preliminarily set given value to the maximum value among all samples.

7. A multi-path detection circuit as set forth in claim 6 wherein said logical pattern represent a peak shape in a single path of the delay profile.

8. A multi-path detection circuit as set forth in claim 6, wherein said logical pattern represents the peak shape and side lobe contained therein in a single path of the delay profile.

9. A multi-path detection circuit for detecting a timing of multi-path by measuring a delay profile of a transmission path, comprising:
   generating means for generating a logic pattern of a correlated peak in said delay profile; and
   detection means for detecting position of the correlated peak on the basis of the logical pattern of the correlated peak generated by said generating means,
   wherein said detection means selects a sample having the most delay period as a maximum point among samples by multiplying a preliminarily set given value to the maximum value among all samples.

10. A multi-path detection circuit for detecting a timing of multi-path by measuring a delay profile of a transmission path, comprising:
    generating means for generating a logic pattern of a correlated peak in said delay profile; and
    detection means for detecting position of the correlated peak on the basis of the logical pattern of the correlated peak generated by said generating means,
    wherein said logical pattern is preliminarily generated on the basis of a coefficient set for a channel filter to be used for band restriction in said transmission path.

11. A multi-path detection circuit as for detecting a timing of multi-path by measuring a delay profile of a transmission path, comprising:
    generating means for generating a logic pattern of a correlated peak in said delay profile; and
    detection means for detecting position of the correlated peak on the basis of the logical pattern of the correlated peak generated by said generating means,
    wherein said detection means comprises removing means for sequentially removing power component of the detected correlated peak from said delay profile using the logical pattern of said correlated peak and means for sequentially detecting the position of said correlated peak from the delay profile by removing the power component of the correlated peak by said removing means,
    wherein said multi-path detection circuit further comprises:
    position interval judgment means for detecting interval of positions of said correlated peaks, and wherein removal of power component of said correlated peak is performed by said removing means depending upon the result of judgment of said position interval judgment means.

12. A multi-path detection circuit comprising:
    a matched filter outputting a correlated value of a spread code and a received signal;
    delay profile storing means for storing a delay profile of a transmission path measured by said matched filter;
    maximum value retrieving means for retrieving a maximum peak position and a peak level from said delay profile stored in said delay profile storing means;
    pattern generating means for sequentially generating logical patterns of correlated peaks on the basis of the peak level and peak position obtained from said maximum value retrieving means; and
    preparing means for preparing a profile by removing a correlation power of the peak retrieved at preceding time by said maximum value retrieving means;

said maximum value retrieving means retrieves said maximum peak value and said peak level sequentially from the profile generated by said pattern generating means, wherein said maximum value retrieving means comprises:

level comparing means for comparing a delay profile data samples and an interim maximum value amount retrieved samples;

selecting means for selecting one of said delay profile data sample and said interim maximum value depending upon the result of comparison by said level comparing means;

buffer means for storing said interim maximum value during maximum value retrieval; and maximum position holding means for outputting a maximum peak position by holding a sample position upon detecting of new maximum value by said level comparing means.

13. A multi-path detection circuit as set forth in claim 12, wherein said maximum value retrieving means includes coefficient calculating means for performing calculation of a preliminarily set given value and an interim maximum value stored in said buffer means, and selecting a sample having the most delay period as a maximum point among samples on the basis of a result of calculation by said coefficient calculation means.

14. A multi-path detection circuit as set forth in claim 12, wherein said preparing means prepares a profile from which has been removed the correlated power of the peak retrieved preceding time by said maximum value retrieving means by removing the logical pattern of the correlated peak generated by said pattern generating means from the delay profile data retrieved with said maximum peak position and said peak level by said maximum value retrieving means.

15. A multi-path detection circuit as set forth in claim 12, wherein said maximum value retrieving means includes coefficient calculating means for performing calculation of a preliminarily set given value and a interim maximum value stored in said buffer means, and selecting a sample having the least delay period as a maximum point among samples on the basis of a result of calculation by said coefficient calculation means.

16. A multi-path detection circuit comprising:

a matched filter outputting a correlated value of a spread code and a received signal;

delay profile storing means for storing a delay profile of a transmission path measured by said matched filter;

maximum value retrieving means for retrieving a maximum peak position and a peak level from said delay profile stored in said delay profile storing means;

pattern generating means for sequentially generating logical patterns of correlated peaks on the basis of the peak level and peak position obtained from said maximum value retrieving means; and preparing means for preparing a profile by removing a correlation power of the peak retrieved at preceding time by said maximum value retrieving means;

said maximum value retrieving means retrieves said maximum peak value and said peak level sequentially from the profile generated by said pattern generating means, wherein said pattern generating means comprises a logical pattern memory storing a preliminarily set logical pattern, setting means for setting a peak level using a logical pattern stored in said logical pattern memory, and peak position setting means for setting a position of the correlated peak from a peak position input and peak shape output from said setting means.

17. A multi-path detection circuit comprising:

a matched filter outputting a correlated value of a spread code and a received signal;

delay profile storing means for storing a delay profile of a transmission path measured by said matched filter;

maximum value retrieving means for retrieving a maximum peak position and a peak level from said delay profile stored in said delay profile storing means;

pattern generating means for sequentially generating logical patterns of correlated peaks on the basis of the peak level and peak position obtained from said maximum value retrieving means; and preparing means for preparing a profile by removing a correlation power of the peak retrieved at preceding time by said maximum value retrieving means, wherein said logical pattern is preliminarily generated on the basis of a coefficient set in a channel filter used for band restriction in said transmission path.

18. A multi-path detection circuit as set forth in claim 17, wherein said logical pattern represents a peak shape in a single path of said delay profile.

19. A multi-path detection circuit as set forth in claim 17, wherein said logical pattern represents a peak shape and a side lobe contained therein in a single path of said delay profile.

20. A multi-lobe detection circuit comprising:

a matched filter outputting a correlated value of a spread code and a received signal;

delay profile storing means for storing a delay profile of a transmission path measured by said matched filter;

maximum value retrieving means for retrieving a maximum peak position and a peak level from said delay profile stored in said delay profile storing means;

pattern generating means for sequentially generating logical patterns of correlated peaks on the basis of the peak level and peak position obtained from said maximum value retrieving means;

preparing means for preparing a profile by removing a correlation power of the peak retrieved at preceding time by said maximum value retrieving means; and position interval judgment means for detecting interval of positions of said correlated peaks, and wherein preparing of a profile from which is removed said correlated power of the peak retrieved preceding time is performed by said preparing means depending upon the result of judgment of said position interval judgment means.

21. A multi-path detection method for detecting a timing of multi-path by measuring a delay profile of a transmission path, comprising the steps of:

generating a logical pattern of a correlated peak in a delay profile; and detecting a position of correlated peak on the basis of the generated logical pattern of said correlated peak, wherein said step of detecting position at said correlated peak selects a sample having the least delay period as a maximum point among samples by multiplying a preliminarily set given value to the maximum value among all samples.

22. A multi-path detection method as set forth in claim 21, wherein said logical pattern represent a peak shape in a single path of the delay profile.

23. A multi-path detection method as set forth in claim 21, wherein said logical pattern represents the peak shape and side lobe contained therein in a single path of the delay profile.

24. A multi-path detection method for detecting a timing of multi-path by measuring a delay profile of a transmission path, comprising the steps of:

generating a logical pattern of a correlated peak in a delay profile; and detecting a position of correlated peak on the basis of the generated logical pattern of said correlated peak, wherein said step of detecting position of said correlated peak selects a sample having the most delay period as a maximum point among samples by multiplying a preliminarily set given value to the maximum value among all samples.

25. A multi-path detection method for detecting a timing of multi-path by measuring a delay profile of a transmission path, comprising the steps of:

generating a logical pattern of a correlated peak in a delay profile; and detecting a position of correlated peak on the basis of the generated logical pattern of said correlated peak, wherein said logical pattern is preliminarily generated on the basis of a coefficient set for a channel filter to be used for band restriction in said transmission path.

26. A multi-path detection method for detecting a timing of multi-path by measuring a delay profile of a transmission path, comprising the steps of:

generating a logical pattern of a correlated peak in a delay profile; and detecting a position of correlated peak on the basis of the generated logical pattern of said correlated peak, wherein said step of detecting position of said correlated peak position includes step of sequentially removing power component of the detected correlated peak from said delay profile using the logical pattern of said correlated peak and step of sequentially detecting the position of said correlated peak from the delay profile removed the power component of the correlated peak, and wherein position internal of said correlated peaks are detected to remove power component of the detected correlated peak from the delay profile sequentially depending upon the result of judgment.

* * * * *